(12) United States Patent
Hall

(10) Patent No.: US 7,686,265 B2
(45) Date of Patent: Mar. 30, 2010

(54) CLIP FOR A DETACHABLE COMPONENT

(75) Inventor: William Harold Hall, Kendal (GB)

(73) Assignee: Busybase Limited, Kendal, Cumbria (GB)

( * ) Notice: Subject to any disclaimer, the term of this patent is extended or adjusted under 35 U.S.C. 154(b) by 384 days.

(21) Appl. No.: 11/670,224

(22) Filed: Feb. 1, 2007

(65) Prior Publication Data

US 2007/0181758 A1 Aug. 9, 2007

(30) Foreign Application Priority Data

Feb. 3, 2006 (GB) ................................ 0602161.2

(51) Int. Cl.
*G03B 21/58* (2006.01)

(52) U.S. Cl. ............................. 248/222.11; 248/222.51; 24/289

(58) Field of Classification Search ............ 248/222.11, 248/221.11, 222.51, 223.41, 225.21, 266, 248/273, 267; 24/289, 613; 40/642
See application file for complete search history.

(56) References Cited

U.S. PATENT DOCUMENTS

| 815,893 | A | * | 3/1906 | Adams et al. .................. 211/32 |
| 3,036,803 | A | * | 5/1962 | Fiebelkorn ............. 248/221.11 |
| 4,311,295 | A | | 1/1982 | Jamar, Jr. |
| 4,718,625 | A | * | 1/1988 | Boda ...................... 248/222.11 |
| 5,783,020 | A | * | 7/1998 | Kress .......................... 156/291 |
| 6,111,694 | A | | 8/2000 | Shopp |
| 6,189,248 | B1 | * | 2/2001 | Nagel et al. .............. 40/661.03 |
| 6,336,616 | B1 | | 1/2002 | Lin |
| 6,935,062 | B2 | * | 8/2005 | Lowry et al. ............. 40/661.03 |

FOREIGN PATENT DOCUMENTS

| EP | 1757820 | 3/2005 |
| GB | 2052003 | 9/1979 |
| JP | 08319782 | 5/1995 |
| JP | 2001317277 | 5/2000 |
| WO | WO 2005-029176 | 3/2005 |

* cited by examiner

*Primary Examiner*—Anita M King
(74) *Attorney, Agent, or Firm*—Andrus, Sceales, Starke & Sawall, LLP

(57) ABSTRACT

A clip particularly adapted for releasably attaching a component such as an AV screen to a surface, wherein the component defines a channel having a base wall and a pair of opposed side walls each of which has a recess extending therealong and facing the opposed side wall. The clip has a base member adapted for attachment to the surface with a rear plane in contact therewith, and an arm projecting forwardly at an acute angle to the rear plane so as to be engageable into one of the component side wall recesses. A latch member is slidably supported on the base member and is spring urged away from the arm. The latch member has a leading portion configured for engagement in the recess of the opposed side wall of the component.

11 Claims, 4 Drawing Sheets

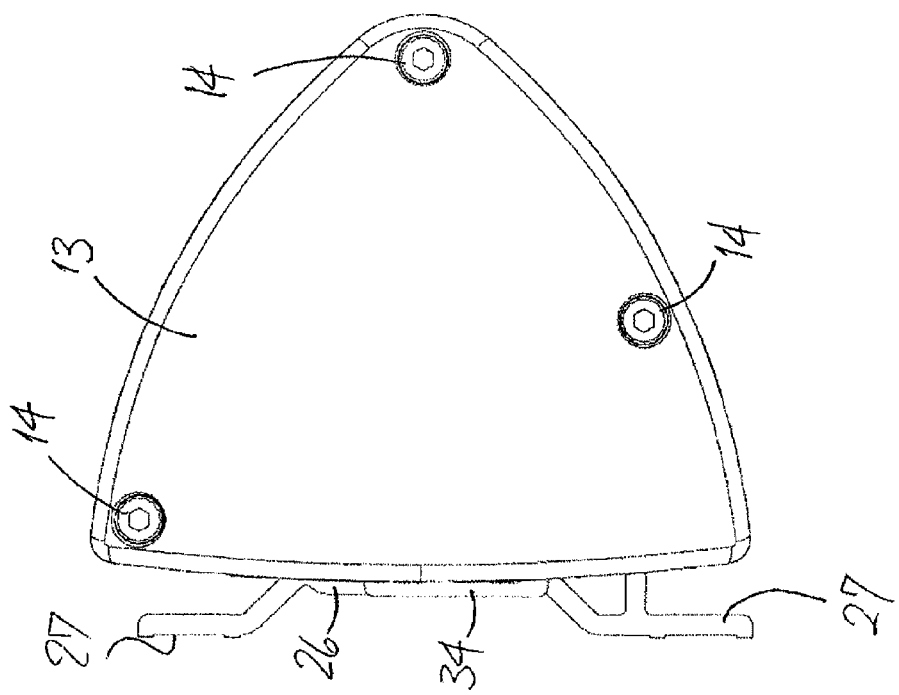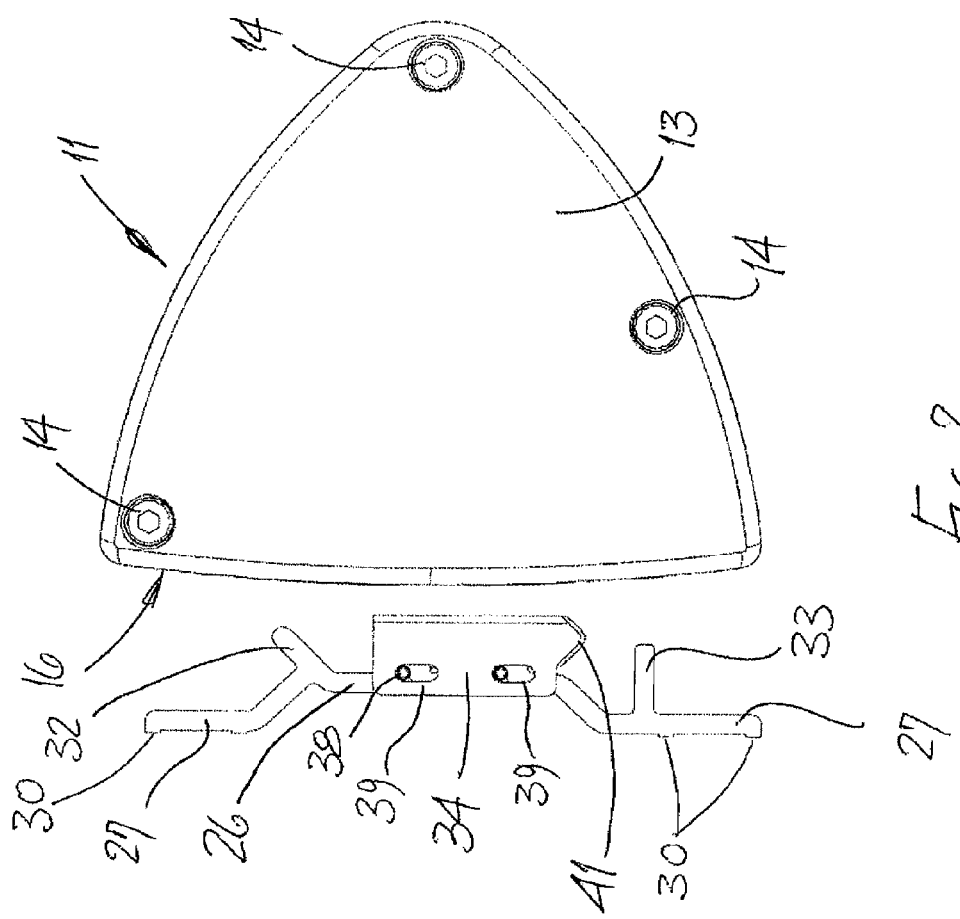

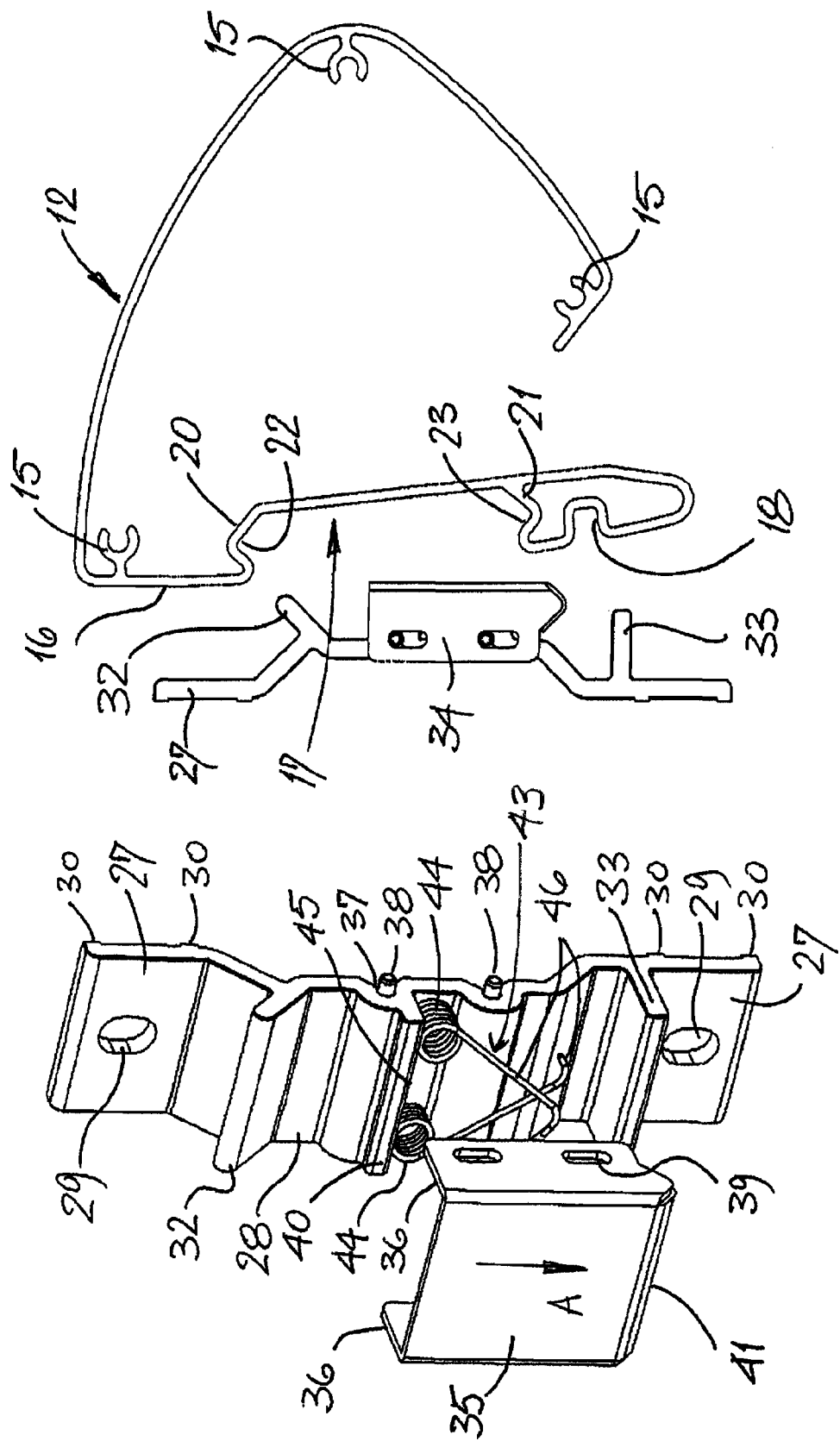

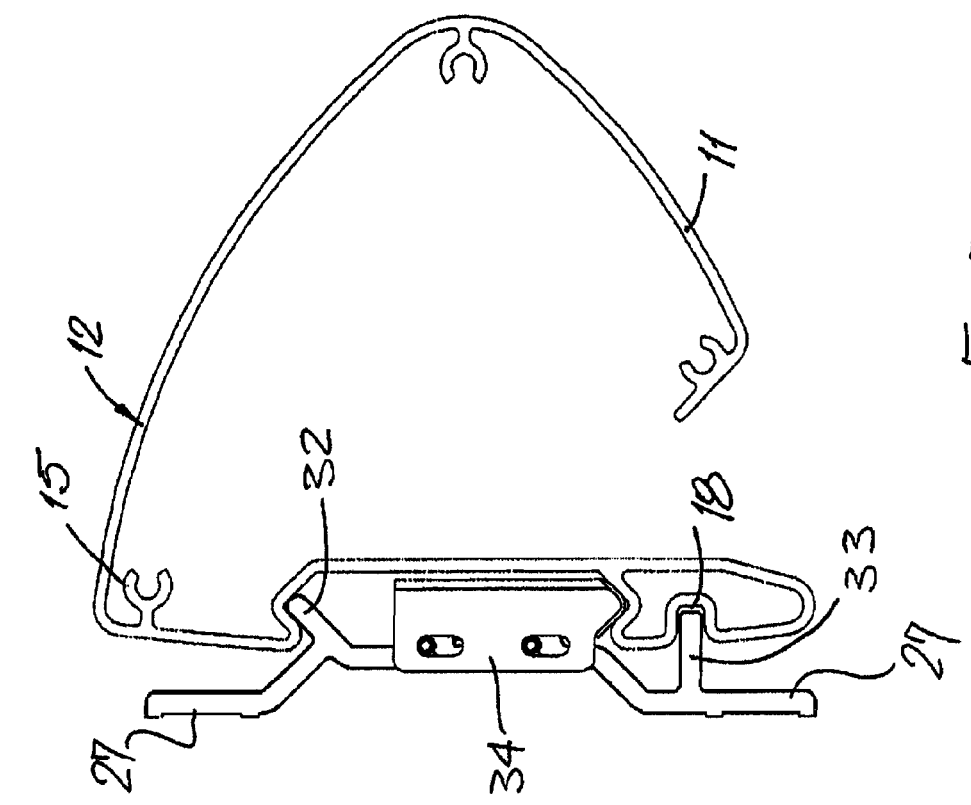
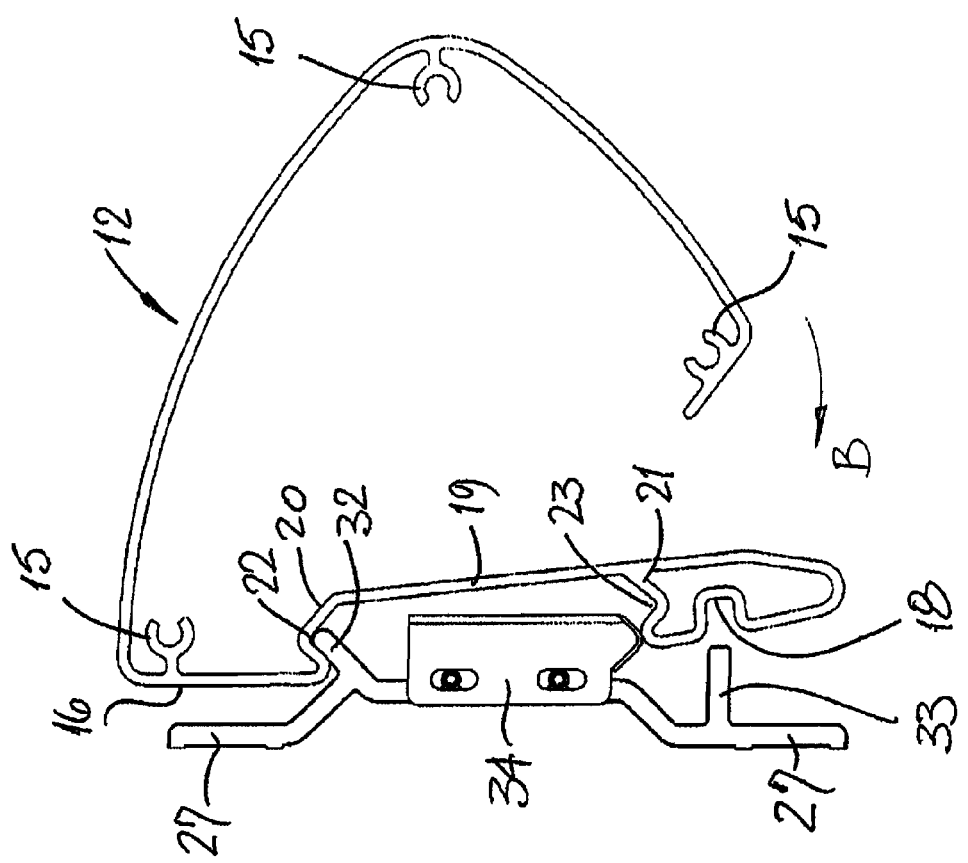

CLIP FOR A DETACHABLE COMPONENT

CROSS REFERENCE TO RELATED APPLICATIONS

This application claims the priority of UK Patent Application No. 0602161.2 filed in the name of Busybase Limited on Feb. 3, 2006.

BACKGROUND OF THE INVENTION a) Field of the Invention

This invention relates to a clip for a detachable component and arranged for mounting on a surface, so that the component may be attached to and released from that surface. The invention further relates to such a clip in combination with a detachable component and in particular—but not exclusively—a retractable screen.

b) Description of the Prior Art

With increasing use of audio-visual (AV) aids for educational and training purposes, and also in a home environment for entertainment purposes, there is a demand for a retractable screen which may easily be mounted in a suitable location when required for use but which may be removed either for storage or for use elsewhere when no longer required in that first location. It is known to provide a stand to support a casing of a retractable screen. More conveniently, the casing may be mounted at a relatively high location on a wall or ceiling, so that the screen may hang down from the casing, when extended. The mounting of a retractable screen casing to a wall or ceiling surface is not easy to perform, particularly having regard to the length and so somewhat unwieldy nature of the casing; as a consequence, users tend to utilise a stand or to install a screen on an essentially permanent basis.

BRIEF SUMMARY OF THE INVENTION

It is a principal aim of the present invention to provide a clip suitable for mounting for example on a wall of ceiling, and which allows a detachable component such as the casing of a retractable screen to be relatively easily attached to and detached from the clip, even if the clip is at an elevated position.

According to this invention, there is provided a clip for releasably attaching a component to a surface wherein said component defines a channel having a base wall and a pair of opposed side walls, a respective recess extending along each of said side walls and facing the opposed side wall, said clip comprising a base member adapted for attachment to said surface, said base member having a rear plane in contact with said surface, an arm projecting forwardly at an acute angle to the rear plane so as to be engageable into the recess of one of said side walls, and a latch member slidably supported on the base member for movement generally parallel to the rear plane towards and away from said arm, said latch member being spring-urged away from the arm and having a leading portion configured for engagement with the recess of the opposed side wall of the component channel.

The base member of the clip of this invention may be secured essentially permanently to a suitable wall or ceiling surface for example by means of screws passing through openings provided in the base member, such that the rear plane of the base member bears on the wall or ceiling surface. Typically, two such clips may be mounted in alignment with each other and spaced apart along the wall or ceiling, whereby an elongate component such as a housing for a retractable screen may be supported by the clips in a secure manner but which may be released when required.

Attachment of the component to the clip is performed by engaging the arm of the base member into the recess of one side wall of the component channel and then pivoting the component about the interengaged arm and side wall so as to move the opposed side wall to engage the latch member. Continued movement of the component in the same sense initially causes the latch member to move against its spring force and then, as the opposed side wall comes into alignment with the latch member, to move under the spring force to allow the leading portion of the latch member to enter the recess of the opposed side wall. Once the latch member leading portion has fully engaged in the recess of that opposed side wall, the security of the connection is determined by the spring force on the latch member and the particular profile of the leading portion of the latch member in conjunction with the shape of the recess with which that leading portion is engaged.

This invention extends to a clip of this invention as described above in combination with a component which defines a channel having a base wall and a pair of opposed side walls, a respective recess extending along each of said side walls and facing the opposed side wall, in which combination said component is attachable to and detachable from the clip by turning the component about the junction between the arm of the clip and the side wall recess in which the arm is received, thereby engaging said leading portion of the latch member with the other side wall recess and disengaging said leading portion of the latch member from the other side wall recess, depending upon the sense of relative movement between the component and clip, the latch member sliding as required to allow the engagement and disengagement aforesaid.

BRIEF DESCRIPTION OF THE DRAWINGS

The drawings show a specific embodiment of clip for attaching a component to a surface which clip is constructed and arranged in accordance with this invention, though solely by way of example. In the drawings:

FIG. 2 is an end view of a clip and the component shown detached from the clip, both as illustrated in FIG. 1;

FIG. 3 is a view similar to that of FIG. 2 but showing the component attached to the clip;

FIG. 4 is an exploded isometric view of one of the clips shown in FIG. 1; and

FIGS. 5, 6 and 7 show three steps in the sequence of attaching the component to a clip.

DETAILED DESCRIPTION OF THE INVENTION

Figure 1:
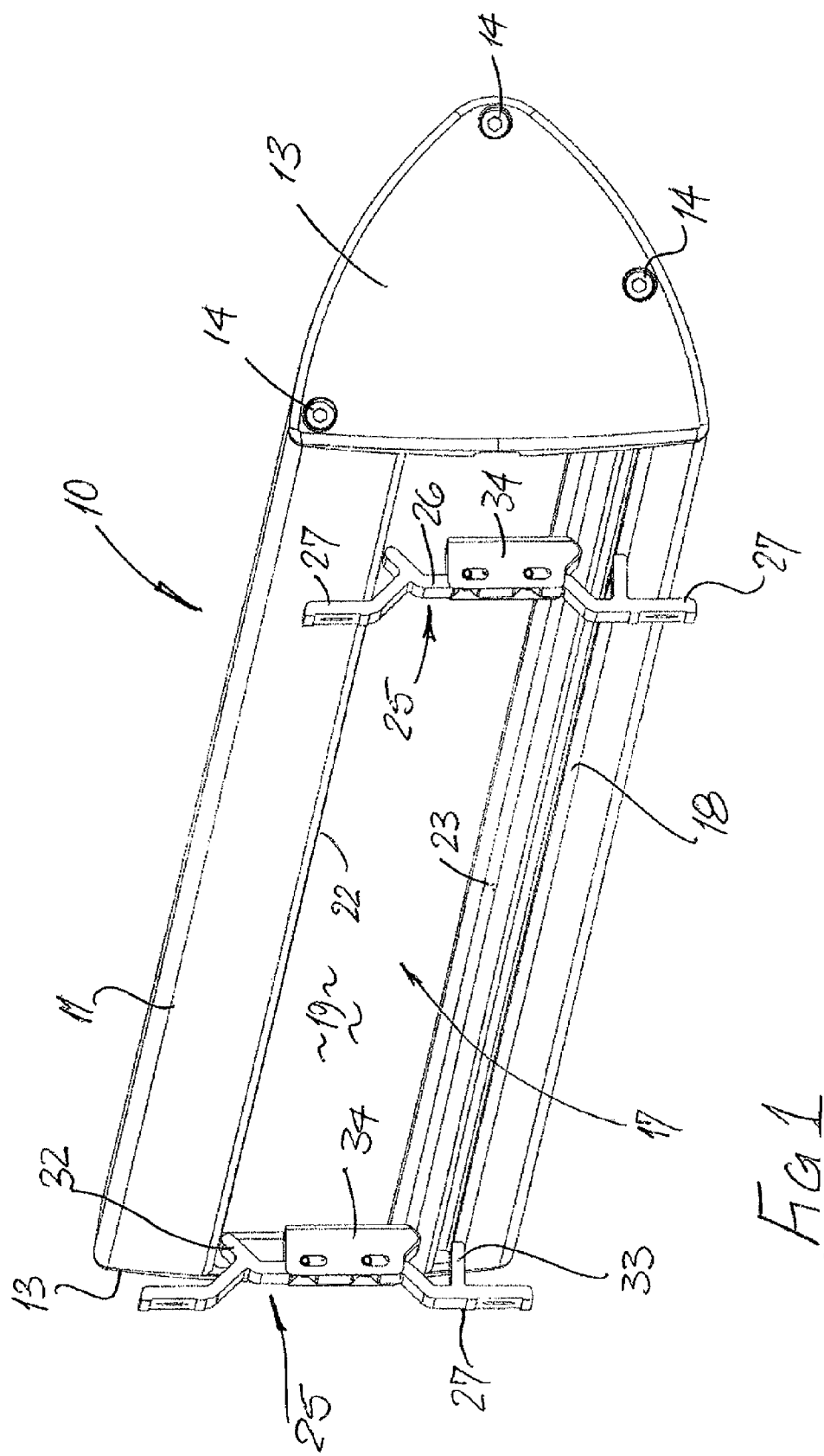
FIG. 1 is an isometric view of the component and two clips, arranged to hold the component for example to a wall.

The base member of the clip of this invention preferably has a pair of mounting legs in the common rear plane, there being a central bridging part stepped out of that plane and interconnecting the mounting legs. For such a base member, the arm preferably projects from one end of the bridging part, where it interconnects with one of the mounting legs. Typically, the arm will project at an angle of around 45° to said rear plane, in a direction away from the main area of the bridging part and forwardly with respect to the rear plane.

The latch member may be slidably supported by the bridging part and in a preferred embodiment the latch member is generally channel-shaped in cross-section with a base region disposed substantially parallel to the bridging part and a pair of side flanks between which the bridging part is disposed. Conveniently at least one pin extends transversely of the bridging part on the rearwardly facing side thereof, the end portions of the pin being received in a pair of aligned elongate apertures provided one in each side flank respectively of the latch member. The or each pin may be received in a respective groove formed on the rearwardly facing side thereof, whereby the limit of sliding movement of the latch member is defined by the shape of the aligned elongate apertures in the side flanks of the latch member.

A spring conveniently is disposed to act between the bridging part and the latch member, to urge the latch member in the direction away from the arm. Such a spring may be in the form of a coil spring with the end portions of the spring projecting tangentially with respect to the turns of the spring whereby those end portions may interact with the latch member and the base member. In an alternative arrangement, the spring includes two coiled portions disposed spaced apart with their axes parallel and with one end portion projecting from each coiled portion respectively. In this arrangement, the bridging member includes an abutment against which the two coiled portions react and the end portions project in the same direction to engage a part of the latch member. Such an arrangement has the advantage that the spring is self-locating and may apply a sufficient force to the latch member securely to hold the component when engaged with the clip.

Preferably, the clip has a further arm which projects forwardly from the base member, substantially perpendicularly to the rear plane and which further arm is receivable in an elongate slot formed in the component spaced from but parallel to the channel of that component. Moving the component to its attached position with respect to the clip will result in the further arm engaging in the elongate slot, so serving to hold the component against movement parallel to the length of the clip base member. Thus, a considerable force may be applied to the component in that direction without the component moving relative to the clip, such as may be required for an arrangement where the component comprises the casing of a retractable screen.

For a case where the clip member includes a further arm, the component should have an elongate slot formed parallel to and spaced from the channel with which the latch member co-operates, thereby to hold the component against movement in a direction parallel to the length of the clip base member, when the component is fully engaged therewith. Preferably, the component includes an aluminium alloy extrusion which defines the channel and, if provided, elongate slot, and which extrusion serves as a mount for other elements such as may be required for a retractable screen.

Referring initially to FIG. 1, there is shown a component 10 in the form of a casing 11 for a retractable screen (not shown) for example comprising a flexible reflective sheet wound on to a roller rotatably supported within the casing, whereby the screen may be unwound to extend from the casing. The casing 11 is made up from an elongate one-piece extrusion 12 (see FIGS. 5 to 7) together with a pair of end plates 13 secured one to each end of the extrusion 12 by means of self-tapping screws 14 threaded into receptors 15 (FIG. 5) formed as parts of the extrusion. The end plates 13 are appropriately configured for supporting the roller within the casing. A winding mechanism (not shown) may be provided if required for the screen.

The extrusion 12 has a rear part 16 which is profiled to define a channel 17 extending along the length of the casing 11 and an elongate slot 18 extending parallel to the channel 17 and spaced therefrom. The channel 17 has a substantially planar base region 19 from which upstand opposed side walls 20,21 each having a respective recess 22,23 extending therealong.

The casing 11 is intended for use with a pair of clips 25, only one of which is shown in the drawings apart from in FIG. 1. Each clip has a base member 26 comprising a pair of mounting legs 27 extending in a common plane and a bridging part 28 extending between and interconnecting the mounting legs 27, the bridging part being stepped out of the common plane of the mounting legs. Each mounting leg 27 is provided with a through-slot 29 by means of which the base member 26 may be secured to a wall or ceiling using conventional screws, the slots permitting adjustment of the position of the base member 26 on the wall or ceiling such that two similar clips may be accurately aligned. Each mounting leg 27 includes two rearwardly directed lips 30, one to each side of the associated through-slot 29, which lips will firmly engage the mounting surface when the mounting screw is tightened, so as thereafter to prevent sliding movement of the clip on the mounting surface.

Projecting forwardly from the junction region between one mounting leg 27 and the bridging part 28 is an arm 32. The arm projects in a direction away from the other mounting leg, forwardly at approximately 45° to the common plane of the mounting legs. A further arm 33 projects forwardly from the other mounting leg 27 adjacent its junction with the bridging part 28, substantially perpendicularly to the common plane.

A latch member 34 is mounted on the bridging part 28 for sliding movement parallel to the length of the bridging part. This latch member is channel-shaped in cross-section and has a base region 35 and a pair of side flanks 36 the base region lying substantially parallel to the bridging part 28 and between the side flanks 36. The rear face of the bridging part is provided with a pair of grooves 37 in each of which is located a respective pin 38 projecting beyond the side edges of the bridging part. Each side flank 36 of the latch member has a pair of elongate openings 39 in which the end portions of the pins 38 are located. A wall 40 upstands from the bridging part 28 and engages the internal face of the base region 35 to guide movement thereof. The leading part 41 of the latch member has a generally rounded profile as shown in the drawings, with the base region 35 being extended to wrap round that rounded profile.

A spring 43 is disposed between the base member 26 and the latch member 34, that spring being wound from a continuous length of spring wire so as to have a pair of spaced coiled portions 44 disposed with their axes parallel and interconnected by a central wire length 45, and the two end portions 46 of the wire projecting tangentially one from each coiled portion 44, as shown in FIG. 4. The coiled portions 44 of the spring 43 bear against wall 40 of the base member 26 and the end portions 46 bear on the wrapped-round base region 35 of the latch member 34, at the leading part 41 thereof. In this way, the spring urges the latch member in the direction of its leading part 41, as shown by arrow A.

FIGS. 5 to 7 show a sequence of steps performed to connect the casing 11 to a pair of clips 25, only one of which is shown in these Figures. The casing 11 is offered to the clips with channel 17 facing the bridging part 28 of each clip and with the elongate slot 18 generally opposed to the further arm 33 (FIG. 5). Arm 32 is then engaged with the recess 22 in side wall 20 of channel 17 and the casing 11 is pivoted about the interengaged arm and recess, as shown by arrow B in FIG. 6. This brings side wall 21 into engagement with the leading part 41 of the latch member 34 and in view of the rounded profiles of both the leading part of the latch member and the edge of the side wall 21, the latch member moves against its spring bias provided by spring 43, to permit the latch member to move into channel 17 (FIG. 6). Continued movement of the casing in the direction of arrow B brings the leading part 41 fully into engagement with the recess 23 of side wall 21. Simultaneously, the further arm 33 engages into the elongate slot 18 of the casing 11 and so resists movement of the casing with respect to the clips 25 in the direction parallel to the lengths of the base members 26 of the clips.

Detachment of the casing 11 is performed by pivoting the casing about the interconnection of the arm 32 with recess 22 in side wall 20 in the opposite sense to arrow B. The latch member again moves against the spring force provided by spring 43 so as to come free of the recess 23. Simultaneously, the further arm 33 comes free of the elongate slot 18.

It will be appreciated that the clip and casing combination of this embodiment as described above allows easy and rapid attachment of the casing to a wall already having a pair of clips 25 secured thereto. When attached, the casing is securely held, particularly against a force which will be applied to the casing parallel to the plane of the wall, to extend a screen wound on a roller within the casing, or merely consequent upon the screen being extended from the casing.

I claim:

1. A clip for releasably attaching a component to a surface wherein said component defines a channel having a base wall and a pair of opposed side walls, a respective recess extending along each of said side walls and facing the opposed side wall, said clip comprising a base member adapted for attachment to said surface, said base member having a pair of mounting legs in a common rear plane for contacting said surface, a central bridging part stepped out of said rear plane, an arm projecting forwardly at an acute angle from one end of the bridging part so as to be engageable into the recess of one of said side walls, and a latch member slidably supported by the bridging part for movement generally parallel to the rear plane towards and away from said arm, said latch member being generally channel-shaped in cross-section and having a base region disposed substantially parallel to the bridging part and a pair of side flanks between which the bridging part is disposed, and said latch member being spring-urged away from the arm and having a leading portion configured for engagement with the recess of the opposed side wall of the component channel.

2. The clip as claimed in claim 1, wherein the latch member is connected to the bridging part by at least one pin that extends transversely of the bridging part, the end portions of the pin being received in a pair of elongate apertures provided one in each side flank respectively of the latch member.

3. The clip as claimed in claim 2, wherein the pin is received in a groove formed on the rearwardly directed face of the bridging member.

4. The clip as claimed in claim 2, wherein two parallel pins are provided to connect the latch member to the bridging part, the pins being disposed in respective spaced grooves in the bridging member and received in spaced elongate apertures in the side flanks.

5. The clip as claimed in claim 1, wherein a spring is disposed between the bridging part and the latch member to urge the latch member away from the arm.

6. The clip as claimed in claim 5, wherein the spring comprises a pair of spaced interconnected coiled portions and each coiled portion has an end portion which projects tangentially from the coiled portion, the coiled portions bearing on an abutment provided on the base member of the clip and the end portions bearing on the latch member.

7. The clip as claimed in claim 6, wherein the abutment upstands from the bridging member and acts as a guide for the sliding movement of the latch member.

8. The clip as claimed in claim 1, wherein the base member includes a further arm projecting forwardly therefrom and which is receivable in an elongate slot provided in said component, when the component is fully engaged with the clip.

9. The clip as claimed in claim 8, wherein the further arm projects substantially perpendicularly from a mounting leg of the base member, to one side of the bridging part.

10. The clip as claimed in claim 1 in combination with a component, said component defining a channel having a base wall and a pair of opposed side walls, a respective recess extending along each of said side walls and facing the opposed side wall, said component is attachable to and detachable from the clip by turning the component about the junction between the arm of the clip and the side wall recess in which the arm is received, thereby engaging said leading portion of the latch member with the other side wall recess and disengaging said leading portion of the latch member from the other side wall recess, depending upon the sense of relative movement between the component and clip, the latch member sliding as required to allow the engagement and disengagement aforesaid.

11. The combination as claimed in claim 9, wherein the component comprises an elongate casing within which is mounted a retractable screen.

\* \* \* \* \*